(12) United States Patent
Dallal et al.

(10) Patent No.: US 11,695,215 B2
(45) Date of Patent: Jul. 4, 2023

(54) LENS ANTENNA ARRAY SYSTEM WITH MULTIPLE NEAR-FIELD COMMUNICATION LINKS

(71) Applicant: QUALCOMM Incorporated, San Diego, CA (US)

(72) Inventors: Yehonatan Dallal, Kfar Saba (IL); Shay Landis, Hod Hasharon (IL); Assaf Touboul, Netanya (IL)

(73) Assignee: QUALCOMM Incorporated, San Diego, CA (US)

( * ) Notice: Subject to any disclaimer, the term of this patent is extended or adjusted under 35 U.S.C. 154(b) by 240 days.

(21) Appl. No.: 17/202,080

(22) Filed: Mar. 15, 2021

(65) Prior Publication Data

US 2022/0029304 A1   Jan. 27, 2022

Related U.S. Application Data

(60) Provisional application No. 63/055,109, filed on Jul. 22, 2020.

(51) Int. Cl.
| | |
|---|---|
| *H01Q 19/06* | (2006.01) |
| *H01Q 21/06* | (2006.01) |
| *H01Q 3/24* | (2006.01) |
| *H04B 17/336* | (2015.01) |

(52) U.S. Cl.
CPC ......... *H01Q 19/062* (2013.01); *H01Q 21/065* (2013.01); *H04B 17/336* (2015.01)

(58) Field of Classification Search
CPC .......... H01Q 3/245; H01Q 3/40; H01Q 19/06; H01Q 19/062; H01Q 3/24; H01Q 3/30; H01Q 21/06; H01Q 21/065; H04B 17/309; H04B 17/336; H04B 1/40
See application file for complete search history.

(56) References Cited

U.S. PATENT DOCUMENTS

| | | | |
|---|---|---|---|
| 9,042,936 B2 | 5/2015 | Chiou et al. | |
| 11,528,076 B1 * | 12/2022 | Bily | H04B 7/18513 |
| 2018/0269576 A1 * | 9/2018 | Scarborough | H01Q 3/46 |
| 2021/0376461 A1 * | 12/2021 | Dallal | H01Q 3/2658 |
| 2022/0029301 A1 | 1/2022 | Dallal et al. | |
| 2022/0029312 A1 * | 1/2022 | Dallal | H04B 7/0617 |

FOREIGN PATENT DOCUMENTS

WO   WO-2016028226 A1 *   2/2016   ......... H04B 10/1123

* cited by examiner

*Primary Examiner* — Blane J Jackson
(74) *Attorney, Agent, or Firm* — Hayes and Boone LLP

(57) ABSTRACT

A lens antenna array system for wireless communication is provided that includes a lens antenna array transmitter having a first lens and a lens antenna array receiver having a second lens. The lens antenna array transmitter transmits a plurality of RF signals across a plurality of near-field communication links to the lens antenna array receiver.

29 Claims, 11 Drawing Sheets

LENS ANTENNA ARRAY SYSTEM WITH MULTIPLE NEAR-FIELD COMMUNICATION LINKS

CROSS-REFERENCE TO RELATED APPLICATIONS

This application is claims priority to U.S. Provisional Patent Application No. 63/055,109, filed Jul. 22, 2020, which is hereby incorporated by reference in its entirety.

TECHNICAL FIELD

The technology discussed below relates generally to wireless communication systems, and more particularly, to a lens antenna array system having a plurality of near-field communication links.

BACKGROUND

To meet the growing demands for expanded mobile broadband connectivity, wireless communication technologies advanced from the long-term evolution (LTE) technology to a next generation new radio (NR) technology, which may also be referred to as 5th Generation (5G). For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. Despite this wide array of spectrum bands, the supported data rates may not be sufficient for very-high-data-rate communication.

To provide increased bandwidth to support higher data rates, 5G and future standards such as the 6th generation (6G) propose the use of sub-Terahertz (e.g., 100 GHz to 300 GHz) carrier frequencies. At these higher frequencies, the radio frequency (RF) signal begin to propagate similarly to visible light. Given this similarity to light propagation, various systems have been proposed in which an antenna array is combined with a lens to form a lens antenna array.

SUMMARY

The following presents a simplified summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In accordance with an aspect of the disclosure, a lens antenna array system is provided that includes: a first lens; a plurality of transmit antennas arranged in a focal region of the first lens; a second lens; and a plurality of receive antennas arranged in a focal region of the second lens, the first lens being aligned with the second lens so that a plurality of transmitted RF signals propagates from the first lens to the second lens in a near-field regime.

In accordance with another aspect of the disclosure, a method of wireless communication is provided that includes: modulating a first RF signal responsive to a first input data stream to form a first modulated RF signal; driving the first modulated RF signal through a first transmit antenna at a first location within a focal region of a first lens to transmit the first modulated RF signal from the first lens; propagating the first modulated RF signal across a near-field separation between the first lens and a second lens, the first modulated RF signal arriving with a first angle-of-arrival at the second lens; and focusing the first modulated RF signal through the second lens responsive to the first angle-of-arrival to concentrate the first modulated RF signal on a first receive antenna at a first location within a focal region of the second lens.

In accordance with yet another aspect of the disclosure, a method of wireless communication is provided that includes: for a plurality of transmit antennas arranged in a focal region of a first lens so that each transmit antenna maps to a corresponding angle of departure, transmitting an RF signal from each transmit antenna to propagate the RF signal in a near-field regime from the first lens according to the transmit antenna's corresponding angle of departure to arrive at a second lens at a corresponding angle of arrival; and focusing each RF signal through the second lens responsive to the RF signal's corresponding angle of arrival so that each RF signal is focused onto a respective receive antenna from a plurality of receive antennas arranged in a focal region of the second lens.

Finally, in accordance with another aspect of the disclosure, a lens antenna array system is provided that includes: a first processor configured to provide a plurality of baseband input data streams; a plurality of modulators corresponding to the plurality of baseband input data streams, each modulator in the plurality of modulators configured to modulate a respective baseband input data stream from the plurality of baseband input data streams to produce a modulated RF signal; a plurality of power amplifiers corresponding to the plurality of modulators, each power amplifier configured to amplify a respective modulator's modulated RF signal according to a gain to produce an amplified modulated RF signal; a first lens; and a plurality of transmit antennas corresponding to the plurality of power amplifiers, each transmit antenna in the plurality of transmit antennas being configured to transmit the amplified modulated RF signal from a respective power amplifier, the plurality of transmit antennas being arranged in a focal region of the first lens.

These and other aspects of the disclosure will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1A:
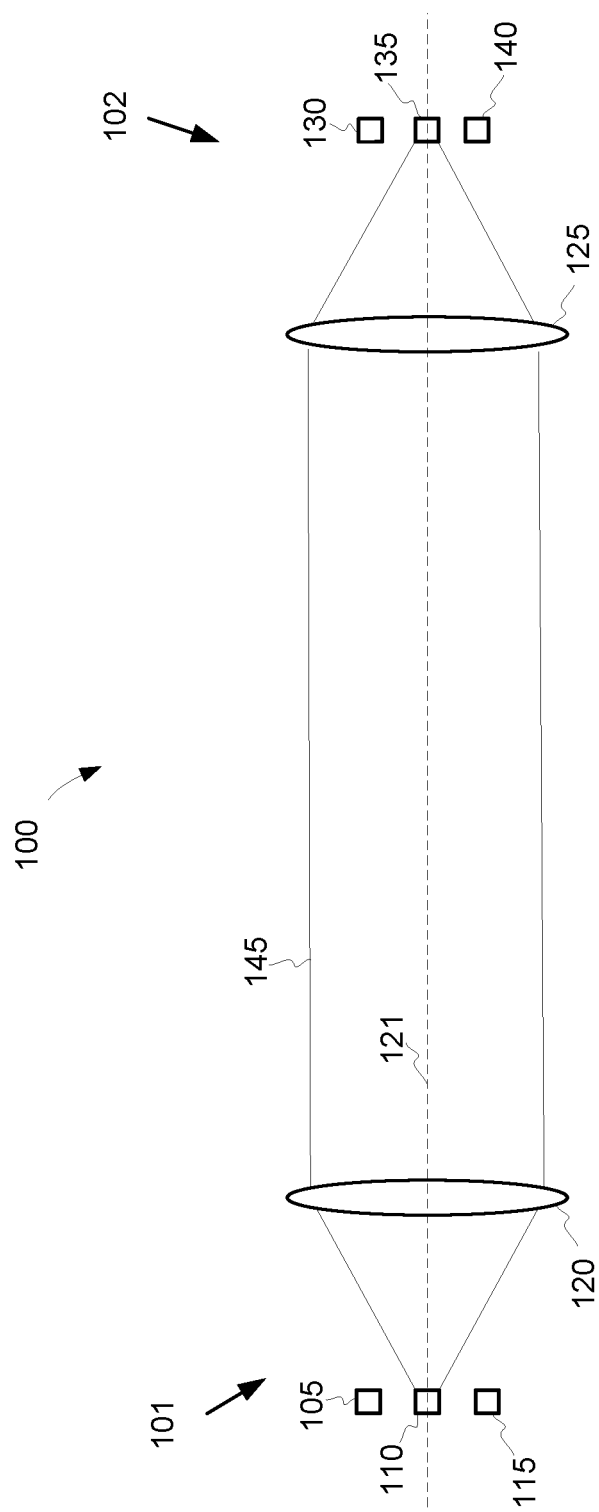
FIG. 1A illustrates a lens antenna array system in which a central transmit antenna transmits a beam to a central receive antenna in accordance with an aspect of the disclosure.

Data flow in static scenarios such as in data centers tends to be very bursty. It is thus typical that a relatively large percentage of the total data flow occurs over a relatively small percentage of the operating time for a computer network data flow. To accommodate such "elephant flows" of data, it is conventional to use an optical fiber link. Data as represented by electronic signals is converted into optical signals that propagate across the fiber from a transmitter to be converted back into electronic form at a receiver. But once installed, an optical link requires a fixed topology. As an alternative, free-space optics may be used such as through the use of micro-electro-mechanical mirrors. But such systems are expensive and difficult to maintain.

To provide an alternative to optical links, a lens antenna array system is disclosed that is readily reconfigured so that a transmitter and a receiver may be re-positioned yet offers the bandwidth to accommodate relatively-large data rates (e.g., 25 to 100 Gbps). The system includes both simplex and duplex embodiments with regard to communication between two lens antenna array endpoints. In a simplex mode of operation, one of the endpoints is a lens antenna array transmitter whereas a second one of the endpoints is a lens antenna array receiver. In a duplex embodiment, both endpoints function as a lens antenna array transmitter and as a lens antenna array receiver. The following discussion will be directed to a simplex embodiment without loss of generality such that there is a dedicated lens antenna array transmitter endpoint and a dedicated lens antenna array receiver endpoint. But since the topology of the endpoints may be the same, the roles of such fixed endpoints are readily reversed such that what is described as a transmitter may instead function as a receiver. Similarly, what is described as a receiver may instead function as a transmitter.

The lens antenna array transmitter includes an array of transmit antennas arranged in a focal region of a first lens. The lens antenna array receiver also includes an array of receive antennas arranged in a focal region of a second lens. To obtain the desired high data rates, the data being transmitted by the lens antenna array transmitter may be divided into multiple streams. In such embodiments, each data stream corresponds to a single transmit antenna (or to a single corresponding sub-array of transmit antennas) in the array of transmit antennas. More generally, a unique mapping is provided from a transmitting sub-array of antennas to a corresponding receiving sub-array of antennas. The following discussion will assume that each sub-array of antennas is formed by just one antenna without loss of generality. The array of transmit antennas are distributed across the focal region of the first lens such that the transmitted RF signal from each transmit antenna is colimated through the first lens to be transmitted in a corresponding angle of departure from the first lens. The positioning of each transmit antenna in the focal region of the first lens maps into a corresponding AoD-dependent focusing of the RF signal from the transmit antenna/first lens. The second lens provides a corresponding angle-of-arrival-dependent focusing of the received RF signals onto corresponding ones of the receive antennas.

The angle of departure may be defined with regard to a central axis of the first lens. About this central axis, the first lens extends in both an azimuth direction and an elevation direction. Similarly, the array of transmit antennas may be arranged in both the azimuth and elevation directions about a central axis of the focal region of the first lens. An example lens antenna array system 100 is shown in FIG. 1A. A lens antenna array transmitter 101 includes a first lens 120. Some example transmit antennas in the array of transmit antennas include an upper transmit antenna 105, a central transmit antenna 110, and a lower transmit antenna 115. The transmit antennas are arranged in the focal region of the first lens 120. As used herein, the term "lens" may refer to a single lens or may instead denote a collection of multiple lenses.

The position of a transmit antenna in the focal region with respect to a central axis 121 of the first lens 120 determines a corresponding angle of departure for a transmitted data stream from the transmit antenna. For demonstration purposes, each transmit antenna has no azimuth displacement with respect to the central axis 121 although such azimuth displacement exists for other embodiments discussed herein. Upper transmit antenna 105 is displaced positively in the elevation direction from central axis 121. Central transmit antenna 110 has no elevation displacement with respect to central axis 121 so that central transmit antenna 110 is aligned with central axis 121. Lower transmit antenna 115 is displaced negatively in the elevation direction from central axis 121. For illustration purposes, only central transmit antenna 110 is active in FIG. 1A to produce a transmitted RF signal 145 from first lens 120. However, all the transmit antennas may be active in embodiments disclosed herein. Since central transmit antenna 110 is aligned with central axis 121, transmitted RF signal 145 has a zero angle-of-departure in both the azimuth and elevation directions.

Figure 1B:
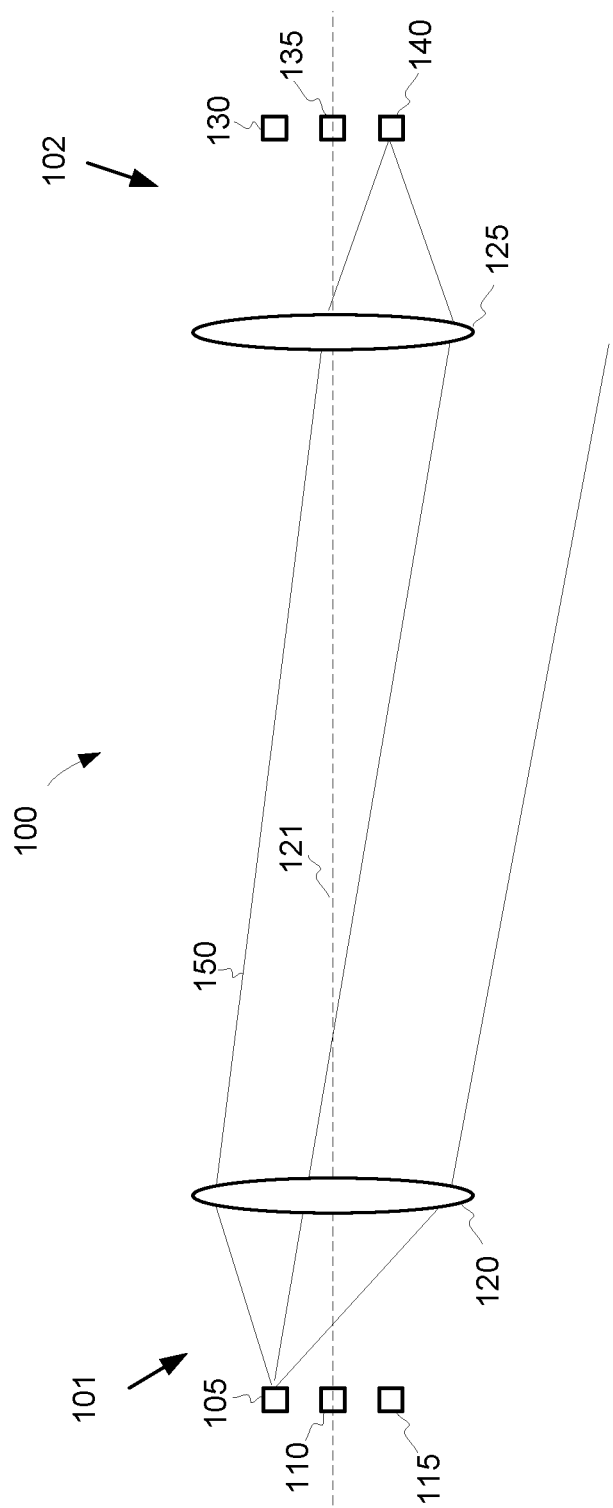
FIG. 1B illustrates a lens antenna array system in which an upper transmit antenna transmits a beam to a lower receive antenna in accordance with an aspect of the disclosure.

Analogous to single transmit antenna operation of FIG. 1A, it is only upper transmit antenna 105 that is active in FIG. 1B. Since upper transmit antenna 105 is displaced positively in elevation from central axis 121, a transmitted RF signal 150 from first lens 120 has a negative angle-of-departure in elevation due to the refraction through first lens 120. Transmitted RF signal 150 has a zero angle-of-departure in azimuth since upper transmit antenna 105 has no azimuth displacement from central axis 121. As discussed with regard to FIG. 1A, all the transmit antennas may be active simultaneously but it is just upper transmit antenna 105 that is active in FIG. 1B for illustration purposes.

Figure 1C:
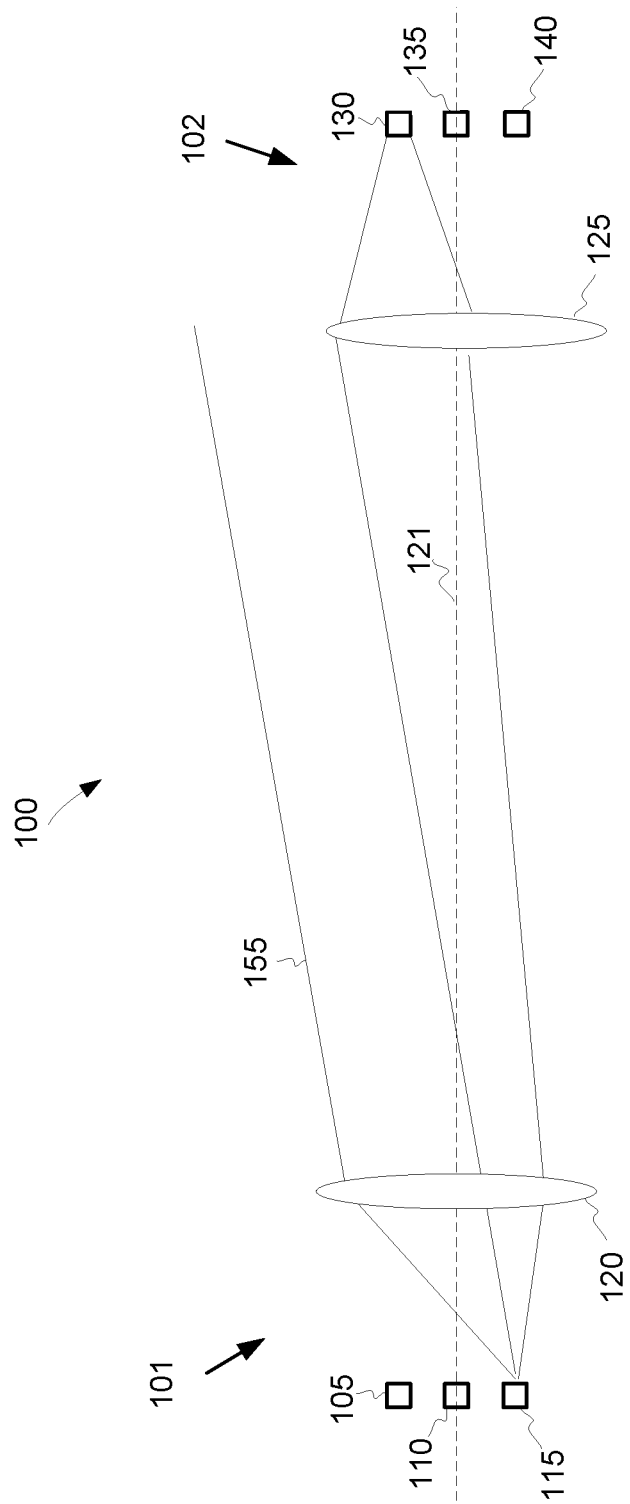
FIG. 1C illustrates a lens antenna array system in which a lower transmit antenna transmits a beam to an upper receive antenna in accordance with an aspect of the disclosure.

In FIG. 1C, it is lower transmit antenna 115 that is active. Since lower transmit antenna 115 is displaced in the negative elevation direction from central axis 121, a transmitted RF signal 155 from first lens 120 has a positive angle-of-departure in the elevation direction with regard to central axis 121. More generally, the displacement from central axis 121 by a transmit antenna in azimuth and/or elevation translates into an angle-of-departure having the opposite signs in the azimuth and/or elevation angles. Should a transmit antenna be displaced in the focal region from central axis 121 by a positive azimuth direction, the corresponding angle-of-departure from first lens 120 will be in the negative azimuth direction. Conversely, should a transmit antenna be displaced in the negative azimuth direction from central axis 121, the corresponding angle-of-departure from first lens 120 will be in the positive azimuth direction.

As shown in FIGS. 1A-1C, a lens antenna array receiver 102 includes a second lens 125 that may have the same dimensions and construction as used for the first lens 120. Second lens 125 is aligned with the first lens 120 such that the central axis 121 is also the central axis 121 for lens 125. An array of receive antennas is aligned along a focal region of the second lens 125. Some example receive antennas include an upper receive antenna 130, a central receive antenna 135, and a lower receive antenna 140.

The position of each receive antenna in the focal region with respect to central axis 121 of second lens 125 determines a corresponding angle-of-arrival for a transmitted RF signal from lens antenna array transmitter 101 that will be focused or concentrated onto the receive antenna. For demonstration purposes, each receive antenna has no azimuth displacement with respect to the central axis 121 although such azimuth displacement exists for other embodiments discussed herein. Upper receive antenna 130 is displaced positively in the elevation direction from central axis 121. Central receive antenna 135 has no elevation displacement with respect to central axis 121 so that central receive antenna 135 is aligned with central axis 121. Lower receive antenna 140 is displaced negatively in the elevation direction from central axis 121.

In some embodiments, the receive antennas are arranged symmetrically with the transmit antennas. Upper receive antenna 130 thus has the same positive elevation displacement from central axis 121 as upper transmit antenna 105. Similarly, lower receive antenna 140 has the same negative elevation displacement from central axis 121 as does lower transmit antenna 115. Central receive antenna 135 is similarly symmetrically positioned with no azimuth or elevation displacement for central axis 121 as discussed for central transmit antenna 110. This symmetry between first lens 120, second lens 125 and the positioning of the receive and transmit antennas results in a one-to-one mapping between each transmit antenna and a corresponding receive antenna that will receive the greatest RF signal from the corresponding transmit antenna. For example, as shown in FIG. 1A, transmitted RF signal 145 from central transmit antenna 110 is received most strongly at central receive antenna 135.

Transmitted RF signal 150 from upper transmit antenna 105 is received most strongly at lower receive antenna 140 as shown in FIG. 1B. Similarly, transmitted RF signal 155 from lower transmit antenna 115 is received most strongly at upper receive antenna 130 as shown in FIG. 1C.

In general, receiving lens 125 provides an angle-of-arrival-dependent (AoA-dependent) focusing of a received RF signal that focuses the resulting RF energy onto a receiving antenna (or sub-array of antennas) in the array of receiving antennas. If lenses 120 and 125 are identical (or substantially identical) and the transmit antennas and the receive antennas have the same positioning in their corresponding focal region, a one-to-one mapping occurs between each transmit antenna and a corresponding receive antenna with regard to the strongest receipt of the transmitted RF signal from the transmit antenna (assuming that the distance between the receive and transmit lenses can be considered small with respect to $D^2/\lambda$, where D is the lens diameter and is the wavelength).

Figure 2:
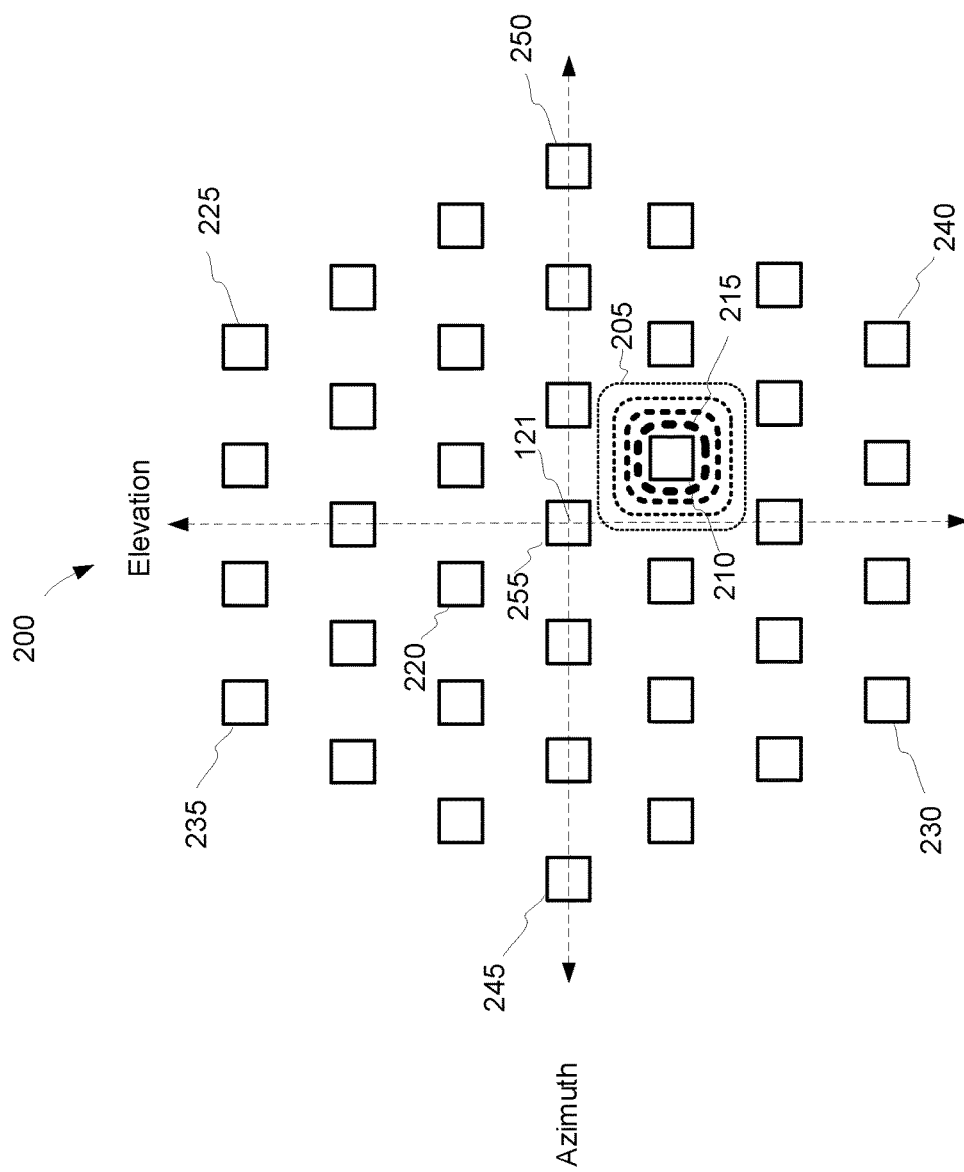
FIG. 2 illustrates a received power profile for a receive antenna in an array of receive antennas for a lens antenna array system in accordance with an aspect of the disclosure.

This one-to-one mapping may be better appreciated with reference to FIG. 2, which illustrates the positioning of an array 200 of antennas in the elevation and azimuth directions from central axis 121. In a symmetric embodiment, an array of transmit antennas has the same positioning in the elevation and azimuth directions as an array of receive antennas. In such an embodiment, it is thus arbitrary to denote array 200 as an array of receive antennas or an array of transmit antennas since the identical positioning is used for both arrays. Given this symmetry, the position of a transmit antenna having a displacement in elevation and azimuth from central axis 121 maps into a receiving antenna with the opposite displacement in both azimuth and elevation. For example, a transmit antenna 220 has a negative displacement in azimuth and a positive displacement in elevation from central axis 121. A received RF signal from such a transmit antenna is thus focused onto a receive antenna 210 with the opposite but same magnitude of azimuth and elevation displacements from central axis 121. The power of the received RF signal is strongest at receive antenna 210 and drops off with respect to a displacement from a center of receive antenna 210. For example, the received signal power on a curve 205 that is relatively displaced from the center of receive antenna 210 is relatively weak compared to the received signal power on a curve 215 that is closer to the center of receive antenna. A similar one-to-one mapping exists between a transmit antenna 235 to a receive antenna 240. Each antenna has a mirror image antenna about central axis 121. Given this mirror image, a positive elevation displacement becomes a negative elevation displacement of the same magnitude. Conversely, a negative elevation displacement becomes a positive elevation displacement of the same magnitude. Similarly, a positive azimuth displacement becomes a negative azimuth displacement whereas a negative azimuth displacement becomes a positive azimuth displacement of the same magnitude. For example, a transmit antenna 225 maps to a receive antenna 230. Similarly, a transmit antenna 245 maps to a receive antenna 250.

Given this one-to-one antenna mapping, an array of N transmit antennas can uniquely transmit N RF signals to N corresponding receive antennas, N being a positive integer. More generally, the mapping may be from one sub-array of transmit antennas to a corresponding sub-array of receive antennas. In an implementation with a one-to-one antenna mapping with N equal to 25 and the data rate for each one-to-one antenna link being 4 Gbs, the system data rate is 4*25=100 Gps.

Referring again to FIGS. 1A-1C, the received signal power is one limiting factor in increasing the data rate despite the advantage of supporting N separate RF signals. To significantly improve the received signal power, the separation between first lens 120 and second lens 125 is such that the RF signal propagation between the two lenses occurs in the near-field regime. With regard to establishing near-field propagation, note that an antenna such as one of the receive antennas or of the transmit antennas will typically have a dimension on the order of a wavelength for the RF signal. For example, the receive and transmit antennas may be patch antennas or dipole antennas. The near-field propagation regime from such wavelength-sized antennas is several wavelengths. The wavelength of a 300 GHz RF signal is approximately 1 mm. If a wavelength-sized transmit antenna is separated by a corresponding wavelength-sized receive antenna by more than several millimeters, the resulting RF signal propagation occurs in the far-field regime. In contrast, the far-field for a lens antenna array is proportional to two times the square of the lens diameter divided by the wavelength. For example, suppose each lens has a diameter of 10 cm. The resulting far-field regime then doesn't start until the lenses are separated by 20 m for operation at 300 GHz. In general, the near-field separation between the lenses depends upon the lens diameter and the operating wavelength. Advantageously, an $R^2$ propagation loss (R being the separation between lenses) does not substantially occur until the separation R is large enough to invoke far-field propagation. With the separation R being less than this far-field threshold, the energy of the transmitted RF signal is effectively contained within a cylinder that extends from the perimeter of first lens 120 to a perimeter of second lens 125 as shown in FIGS. 1A, 1B, and 1C for RF transmitted signals 145, 150 and 155, respectively. The near-field propagation of the RF transmitted signals is thus effectively contained in a waveguide that extends from first lens 120 to second lens 125.

High data rates are achieved by splitting source data to be transmitted into multiple data streams that are transmitted in parallel. Upon recovery at the receiver, the multiple data streams may then be serialized to recover the source data. In a one-to-one embodiment, the number of data streams transmitted in parallel equals the number of the transmit antennas. The modulation and coding scheme (MCS) for each data stream will now be discussed. Note that a high-level MCS is affected by the relatively large phase noise (jitter) that exists for RF signaling at high frequencies such as in the sub-THz bandwidth from 100 to 300 GHz. The bandwidth for each data stream is also an issue. The bandwidth is a function of the data rate in each data stream. As the bandwidth (and hence the individual link data rate) increases, analog-to-digital conversion for each data link in lens antenna array receiver 102 becomes more problematic. In addition, the use of in-phase and quadrature-phase signaling for each data link leads to increased power consumption. Furthermore, the use of frequency transform techniques such as a fast Fourier transform is also problematic as the data rate is increased. In light of these factors, a particularly advantageous MCS is the use of on-off keying. In on-off keying, an RF signal (for example, a sinusoid) is either transmitted (ON) or not transmitted (OFF) in sequential symbols. For example, in a first binary symbol the RF signal may be transmitted but in a subsequent second binary symbol no RF signal is transmitted. Depending upon the binary convention, the resulting digital word represented by the two symbols is either 10 or 01. Each additional binary symbol adds another bit to the transmitted signal.

Figure 3:
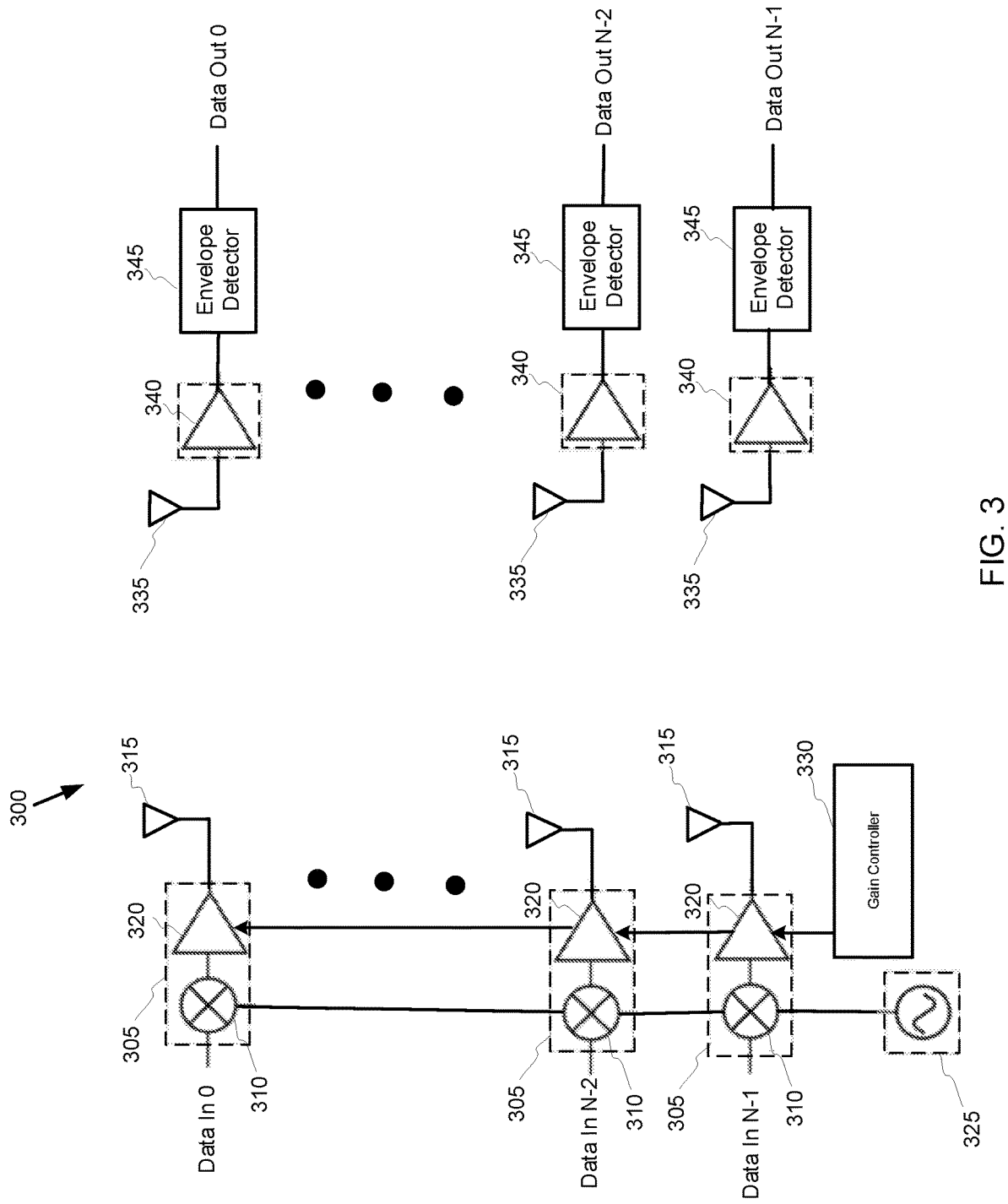
FIG. 3 illustrates a transmitter and receiver configuration for a lens antenna array system with on-off keying modulation in accordance with an aspect of the disclosure.

The length of each symbol may be varied in alternative embodiments but in one embodiment the symbol length may be 10 periods of the operating frequency. The symbol length will thus typically be shorter as the operating frequency is increased due to the resulting shorter period for the RF oscillation. An example lens antenna array 300 with on-off keying (OOK) modulation is shown in FIG. 3. There are N baseband input data streams ranging from a baseband input data stream 0 (Data In 0) to a baseband input data stream N−1 (Data In N−1). Each baseband input data stream drives a mixer 310 in a corresponding OOK modulator 305. An oscillator such as a voltage-controlled oscillator (VCO) 325 generates an RF signal at the desired carrier frequency for driving each mixer 310. Alternatively, each OOK modulator 305 (or subset of OOK modulators 305) may be driven by its own corresponding VCO. The OOK-modulated RF signal from each mixer 310 is amplified by a corresponding power amplifier 320. As will be explained further herein, a gain for each power amplifier 320 may be controlled by a gain controller 330. Each power amplifier 320 drives a corresponding transmit antenna 315 (or sub-array of transmit antennas 315). Each transmit antenna 315 thus transmits an RF data stream that results from the OOK modulation of the RF signal resulting from the upconverting of the corresponding baseband input data stream. Each baseband input data stream is a binary input data stream consisting of binary zero's and binary ones. When a binary one drives a corresponding mixer 310, the on portion of the OOK modulation is produced whereas a binary zero produces the off portion of the OOK modulation. This convention may be reversed in alternative embodiments such that a binary zero produces the on portion whereas a binary one produces the off portion.

If lens antenna array system 300 has a one-to-one mapping between transmit antennas 315 and a corresponding set of receive antennas 335, each receive antenna 335 receives a corresponding OOK-modulated RF signal and drives a corresponding low-noise amplifier 340 accordingly. An envelope detector 345 is associated with each low-noise amplifier 340 to envelope detect the resulting amplified OOK-modulated received RF signal to produce a baseband output data stream. Since there are N envelope detectors 345, there are N baseband output data streams ranging from a zeroth baseband output data stream (Data Out 0) to an (N−1)th baseband output data stream (Data Out N−1). The envelope detection is binary in that either an envelope is detected (the "on" of the OOK modulation) to produce a binary 1 output in the corresponding baseband output data stream or no signal (the "off" of the OOK modulation) is detected to produce a binary zero in the same baseband output data stream. Alternatively, an active-low convention may be used by each envelope detector 345 such that the detection of an envelope produces a binary zero and the detection of the lack of an envelope produces a binary one.

Although the near-field RF propagation advantageously reduces the propagation loss, the one-to-one mapping from a transmit antenna to a receive antenna is not perfect such that some RF energy from the transmit antenna is received by other receive antennas besides the one targeted by the antenna mapping. The resulting interference at other receive antennas may be a limiting factor in increasing the overall data rate for the lens antenna array systems disclosed herein. The interference may be reduced by limiting the number of transmit antennas and receive antennas that are distributed across the focal region of their respective lenses. But reducing the number of antennas then reduces the number of independent data streams that can be transmitted.

With regard to the number of antennas, array 200 of FIG. 2 has 37 antennas (N=37). As noted earlier for an embodiment with symmetric transmit and receive antenna positioning, it is arbitrary to denote array 200 as either a receive or a transmit array. The following discussion will consider array 200 as representing both arrays. Each antenna may be positioned in increments of azimuth and elevation displacement as measured in some multiple of the wavelength. In one embodiment, this inter-element spacing may be 1.8 times the wavelength, but this may be varied in alternative embodiments. If each lens diameter is 150 mm, the focal length is 151 mm, the inter-element spacing is $1.8*\lambda$ and the range separation R is 3 meters for a lens antenna array system having transmit and receive arrays arranged as shown for array 200 with an operating frequency of 300 GHz, the signal-to-interference ratio (SIR) at each receive antenna will depend upon the gain for each power amplifier 320 of FIG. 3. For example, if the gain is equal to a default level for each power amplifier 320 and the operating parameters are as just discussed, it may be shown that the SIR will vary widely across the various receive antennas in array 200. In particular, a central-most antenna 255 will receive its corresponding RF signal with the highest SIR (e.g, in excess of 11 dB). Other centrally-located antennas such as antenna 210 may receive RF signals with similarly-high SIRs. Conversely, the received RF signals for antennas 235, 225, 245, 250, 230, and 240 at the outskirts of array 200 have much lower SIRs (e.g. approximately −0.3 dB). The one-to-one links with a high SIR (e.g, greater than 10 dB) could employ a higher order modulation and coding scheme (MCS) than OOK such as quadrature phase-shift keying. But such relatively high-order MCS cannot be employed for the links with relatively-low SIR. In addition, the use of higher-order MCS complicates the design. To achieve a suitable SIR for each antenna using a lower-order MCS such as OOK, gain controller 330 may boost the gain for those links with relatively-low SIR and decrease the gain for the links with higher SIR. For example, suppose that the gain for the power amplifier 320 amplifying the RF signal that is transmitted to central-most antenna 255 is reduced by approximately 11 dB. Lower levels of gain reduction may then be employed as the receive antenna position becomes less central in array 200. This gain reduction may then transition to a gain increase for antennas at the outer perimeter of array 200. For example, the gain for the transmit antennas immediately adjacent to central-most antenna 255 may be reduced by approximately 10 dB. Conversely, the gain to the outlying antennas at the vertices of the array perimeter such as antennas 225, 230, 235, 240, 245, and 250 may be increased by approximately 6 dB. This results in a sufficient SIR at each of the N links in array 200.

Figure 4:
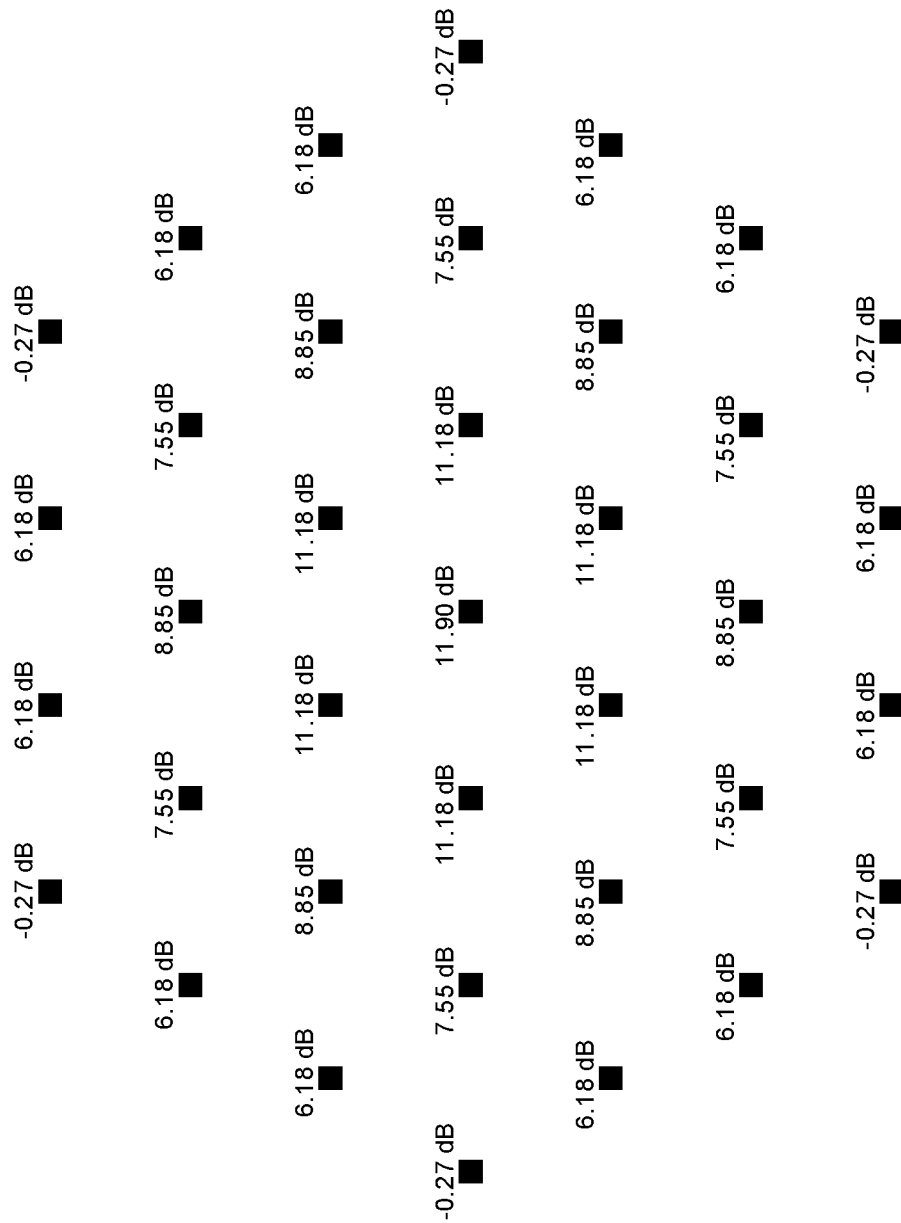
FIG. 4 illustrates the transmit/receive antenna positions for a plurality of active links and their SIR in which each active link uses a default gain in accordance with an aspect of the disclosure.
Figure 5:
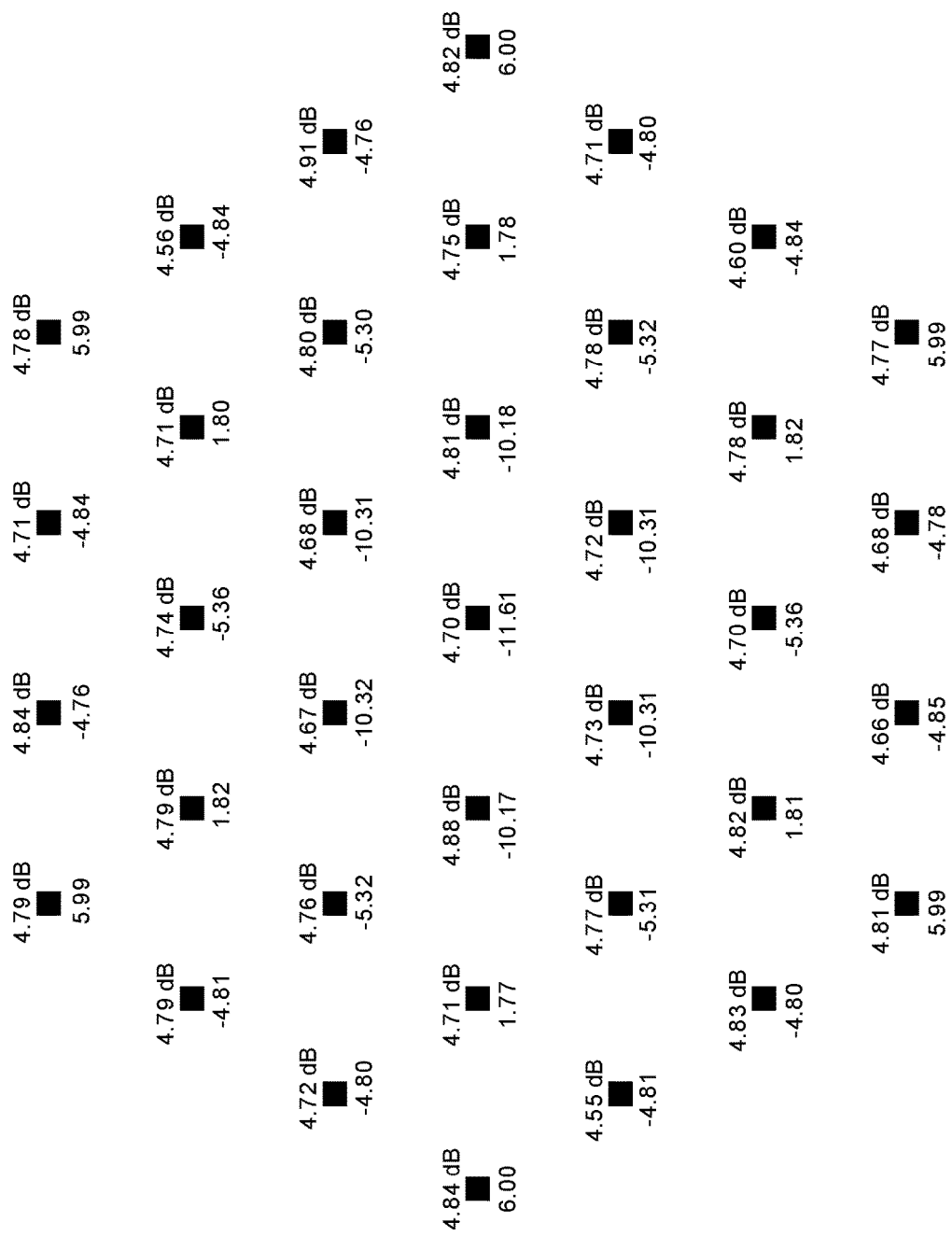
FIG. 5 illustrates the transmit/receive antenna positions for a plurality of active links and their SIR in which each active link uses an adjusted gain (denoted below each active link) to increase overall signal quality in accordance with an aspect of the disclosure.

The resulting gain adjustment for SIR maximization across array 200 may be better appreciated with reference to FIG. 4 and FIG. 5. FIG. 4 illustrates the SIR for each one-to-one antenna link having the same default gain in the embodiment as discussed above with the $1.8*\lambda$ antenna spacing. In general, an SIR of approximately 3 dB or greater may provide a sufficient bit error rate for OOK modulation. All the links have a sufficient SIR except those at the vertices of the array perimeter corresponding to antennas 225, 230, 235, 240, 245, and 250 of FIG. 2. The SIR at those antenna locations is just −0.27 dB. Thus, without any gain optimization, only 31 of the 37 links are operative in the sense of providing a sufficient bit error rate as limited by the corresponding SIR for the link. The result after gain optimization is shown in FIG. 5. At each antenna position, the upper number is the SIR that results from the gain adjustment by the lower number at the antenna position. The link for the central-most antenna location has a gain reduction of 11.61 dB. The links for the antenna locations immediately surrounding the central-most position in the array have a gain reduction of approximately 10 dB. This gain reduction reduces for the links at more remote locations from the central-most position in the array and even transitions to a gain increase of approximately 6 dB for the links at the antenna locations 225, 230, 235, 240, 245, and 250 of FIG. 2. Note that each link has an SIR above 4 dB so that all 37 links may be used. This is quite advantageous for maximizing the data rate.

With regard to the gain adjustment, note that each endpoint may function as both a transmitter and a receiver according to one or more duplexing algorithms. Duplex refers to a point-to-point communication link in which both endpoints can communicate with one another in both directions. In a full-duplex system, both endpoints can simultaneously communicate with one another. In a half-duplex system, only one endpoint can send information to the other at a time. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at one time the channel is dedicated for transmissions in one direction, while at other times the channel is dedicated for transmissions in the other direction, where the direction may change periodically or aperiodically.

Figure 6:
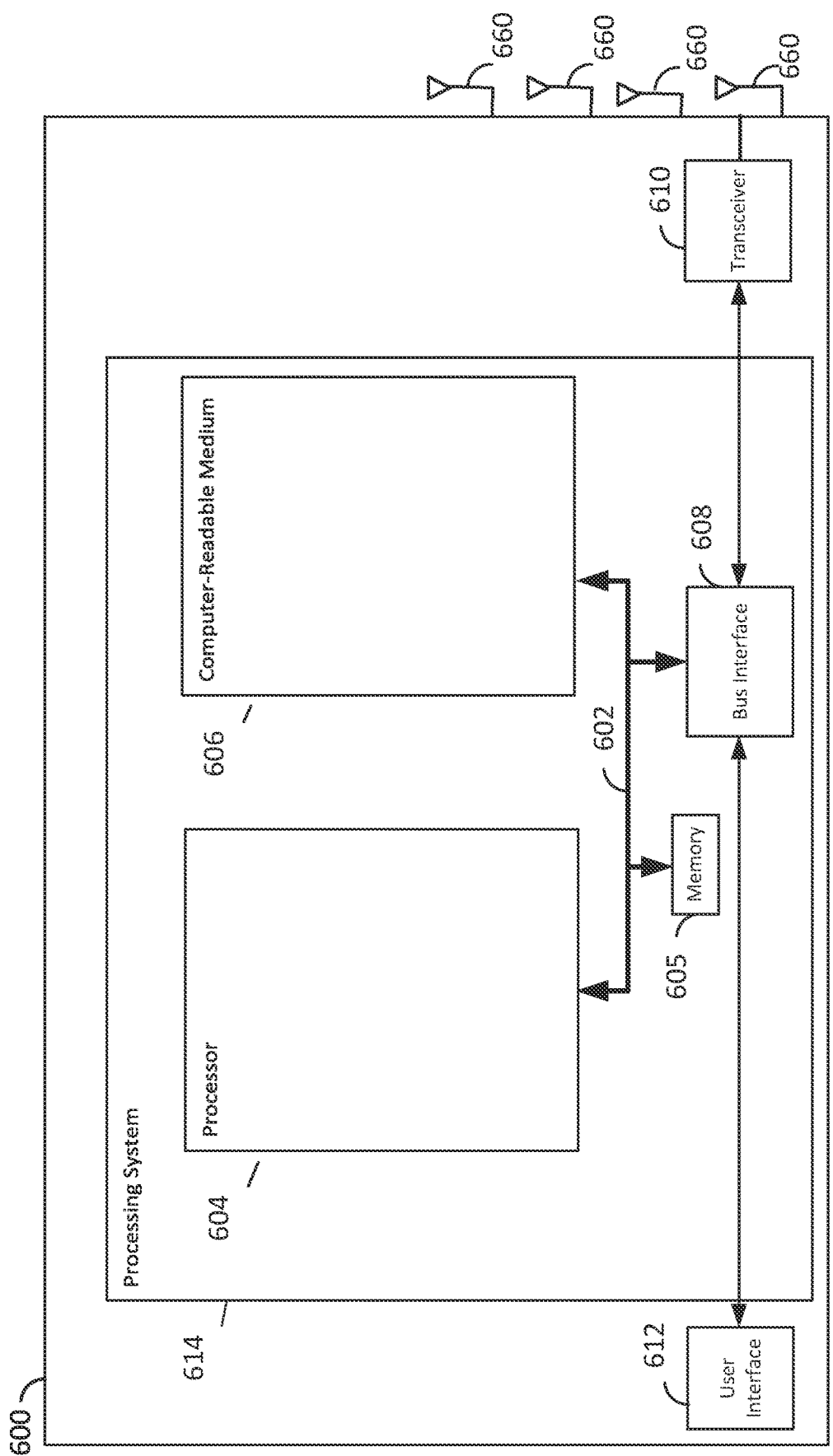
FIG. 6 illustrates an example generic architecture for an access point or a user terminal in a lens antenna array system in accordance with an aspect of the disclosure.

Some example endpoint architectures and corresponding methods of operation will now be discussed. An example endpoint 600 for a lens antenna array system is shown in FIG. 6. For illustration clarity, the associated lens for endpoint 600 is not shown in FIG. 6. Endpoint 600 may also be denoted as a network node. In operation, the point-to-point communication between a pair of network nodes 600 may be deemed to be between an access point network node and a user terminal network node. Network node 600 is generic to either an access point or a user terminal. Network node 600 includes a processing system 614 having a bus interface 608, a bus 602, a memory 605, a processor 604, and a computer-readable medium 606. Furthermore, node 600 may include a user interface 612 and a transceiver 610. Transceiver 610 transmits and receives through an array of antennas 660 as discussed previously with regard to lens antenna array transmitter 101 and lens antenna array receiver 102.

Processor 604 is also responsible for managing the bus 602 and general processing, including the execution of software stored on the computer-readable medium 606. The software, when executed by the processor 604, causes the processing system 614 to perform the massive beam communication disclosed herein. The computer-readable medium 606 and the memory 605 may also be used for storing data that is manipulated by the processor 604 when executing software.

The bus 602 may include any number of interconnecting buses and bridges depending on the specific application of the processing system 614 and the overall design constraints. The bus 602 communicatively couples together various circuits including one or more processors (represented generally by the processor 604), the memory 605, and computer-readable media (represented generally by the computer-readable medium 606). The bus 602 may also link various other circuits such as timing sources, peripherals, voltage regulators, and power management circuits, which are well known in the art, and therefore, will not be described any further. The bus interface 608 provides an interface between the bus 602 and the transceiver 610. The transceiver 610 provides a communication interface or means for communicating with various other apparatus over a transmission medium. Depending upon the nature of the apparatus, a user interface 612 (e.g., keypad, display, speaker, microphone, joystick) may also be provided. For each transmitting/receiving link, transceiver 610 may include the mixer 310, power amplifier 230, oscillator 325, gain controller 330, low-noise amplifier 340, and envelope detector 345 discussed with regard to FIG. 3. Processor 604 may generate the baseband input data stream for each transmitting link and may receive the baseband output data stream from each receiving link.

Figure 7:
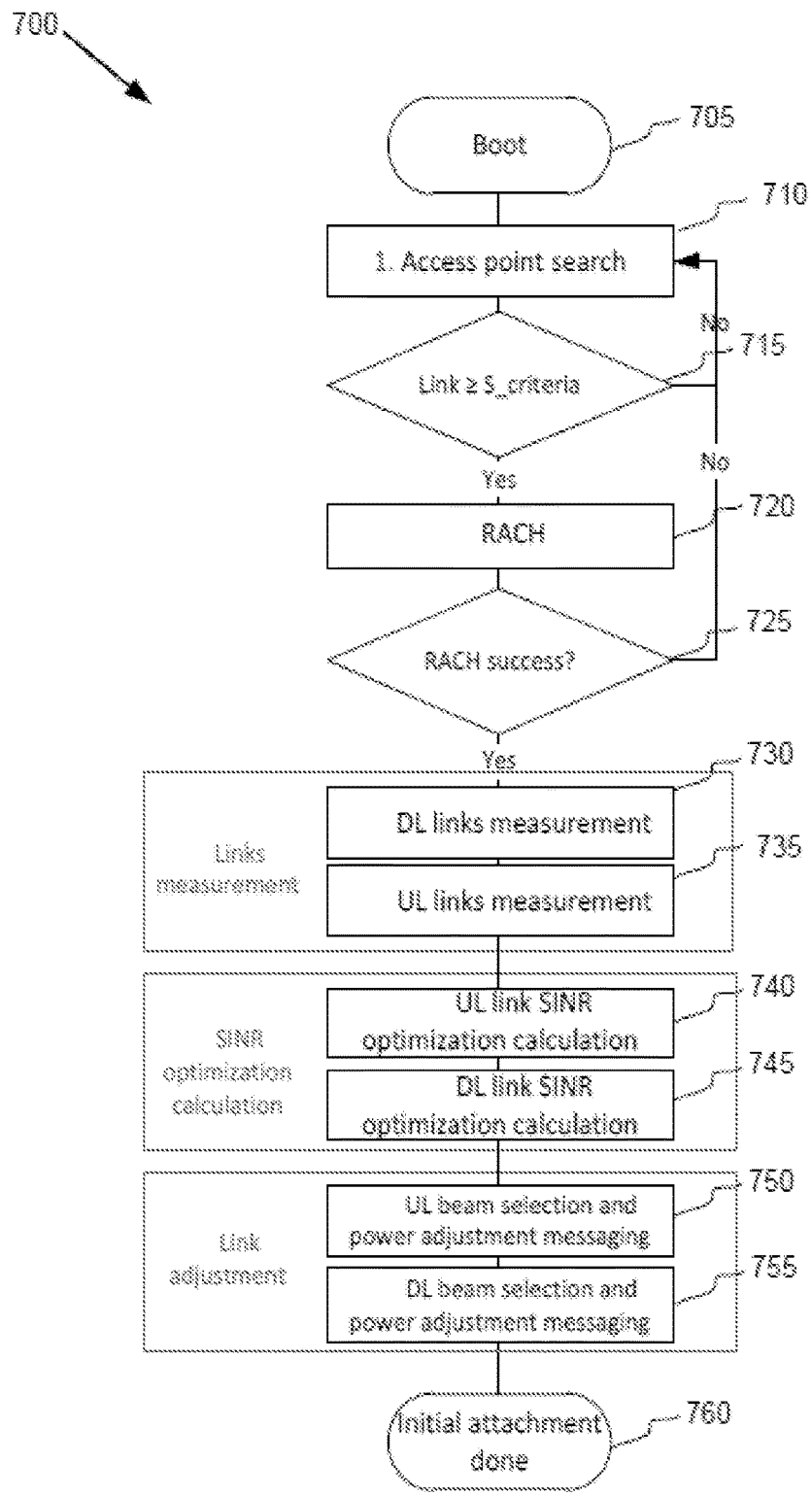
FIG. 7 illustrates a flowchart for a method of establishing the active downlink and uplink links and of optimizing a gain for the active links in a lens antenna array system in accordance with an aspect of the disclosure.

Processor 604 manages the establishment of each communication link and a subsequent optimization of the individual communication link gain. A flowchart for a method 700 of an initial establishment and optimization of the communication links is shown in FIG. 7. Method 700 occurs between an access point and a user terminal. As defined herein, an access point is the network node 600 that initiates the establishment of the communication links. After a boot-up of each processor 604 for the two network nodes (or a single processor in embodiments in which only the access point includes a processor) in a step 705, processor 604 in the access point initiates a search for the user terminal in a step 710. Prior to this search, processor 604 selects the desired number of communication links to be established. Each link may be implemented by a one-to-one mapping of a transmitting antenna to a receiving antenna. More generally, each link may be implemented by a mapping of a sub-array of transmit antennas to a corresponding sub-array of receive antennas. In general, the number of links is limited by the number of transmit antennas that may be driven with a corresponding data stream. Depending upon the implementation, processor 604 may select some or all of the transmit antennas. With the transmit antennas selected, the access point proceeds to test each link. Such a testing may be performed as shown in FIGS. 1A-1C. For example, in FIG. 1A, it is central transmit antenna 110 that is activated. If the antenna lens array receiver 102 is properly aligned with central axis 121, the transmitted RF signal 145 would be focused primarily onto central receive antenna 135. But a misalignment of antenna lens array receiver 102 (in this example, the user terminal) may result in a focusing of the transmitted RF signal 145 onto a different receive antenna. The transmit antenna(s) for each communication link may thus be sequentially (or simultaneously) activated and the resulting focusing onto the receive antennas observed. Processor 604 in the user terminal may thus identify which receive antennas are being targeted by which communication link as determined by whether the corresponding received RF signal for the communication link satisfies a link threshold (S_criteria) in a step 715. For example, the link threshold may be a power threshold for the received RF signal. Alternatively, the link threshold may comprise a successful decoding of a message. In other embodiments, the link threshold may be a signal-to-noise ratio (SNR) threshold.

In general, the number of successful links depends upon the alignment between the access point and the user terminal. The link threshold may thus be a minimum number of links that are acceptable. For example, suppose that N links are desired but that some smaller number of links than N (e.g., N–X, where X is less than N) would also be acceptable. The link threshold could thus be that the number of successful links is greater than or equal to N–X.

After all the links have been scanned and the link threshold satisfied, the user terminal reports the identity of the successful links to the access point in a step 720. Since a priori, it is unknown which links will be successfully established, their identification in a step 720 may be analogized to a random access channel (RACH) message. If the RACH was deemed successful with regard to identifying the desired links in a step 725, a downlink (DL) measurement stage may ensue. If, however, the RACH was not successful, the method returns to the access point search step 710.

In embodiments in which the gain is not being optimized, a connected state would follow a successful RACH step 725 in which the established links would transmit their data streams. However, in embodiments in which the power amplifier gain for the links is adjusted to increase the achievable data rate or to improve the signal quality, method 700 continues with a downlink (DL) measurement step 730 following a successful RACH step 725. The access point transmits over each link to the user terminal. The transmission direction on a link from the access point to the user terminal may be deemed to a downlink transmission. Conversely, the transmission direction on a link from the user terminal to the access point may be deemed to be an uplink (UL) transmission. In step 730, a signal quality is measured for each active downlink link. For example, one measure of signal quality is a signal-to-interference-plus-noise ratio (SINR). Step 730 may thus involve the measurement of the SINR at the user terminal for each active downlink link while the active downlink links are all transmitting simultaneously.

In contrast to a downlink link, an uplink link transmits data from the user terminal to the access point. The measurement steps in method 700 also includes an uplink signal quality measurement in a step 735 that is analogous to the downlink signal quality measurement act 730. In step 735, the signal quality is measured at the access point for each active uplink link while the active uplink links are all transmitting simultaneously. One measure of signal quality is the SINR although other signal quality measures may be used. In embodiments in which the lenses and the antenna arrays are symmetric at both the transmitting endpoint and the receiving endpoint, the uplink link corresponding to a downlink link will involve the same antennas (or sub-arrays of antennas). Thus, the RACH procedure identifies not only the functioning downlink links but also the corresponding uplink links in symmetric implementations.

A signal quality optimization calculation stage follows the link measurement stage. The following discussion will assume that the signal quality is determined by the SINR without loss of generality. The SINR optimization calculation stage includes an optimization calculation for the UL links in a step 740. It is convenient for this calculation to take place in the access point since it is the access point that measured the SINR for the active UL links, but it may be performed by the user terminal in alternative embodiments. Similarly, it is convenient that a DL link optimization calculation step 745 occurs in the user terminal, but it may occur in the access point in alternative embodiments. The optimization calculation may be performed using a formula or may be heuristic. For both the UL and the DL, the calculation determines a gain for the power amplifier in the corresponding link.

A link adjustment stage follows the signal quality optimization stage. The link adjustment stage includes an UL beam selection and power adjustment messaging step 750 in which the access point uses one or more of the active DL links to transmit the calculated UL gain adjustments for the active UL links to the user terminal. Similarly, the user terminal transmits the calculated DL gain adjustments to the access point in a step 755. With both endpoints having the appropriate gains, a connected mode of operation may proceed in a step 760 in which the active DL and UL links transmit data using their power amplifiers 320 at their adjusted gain.

Figure 8:
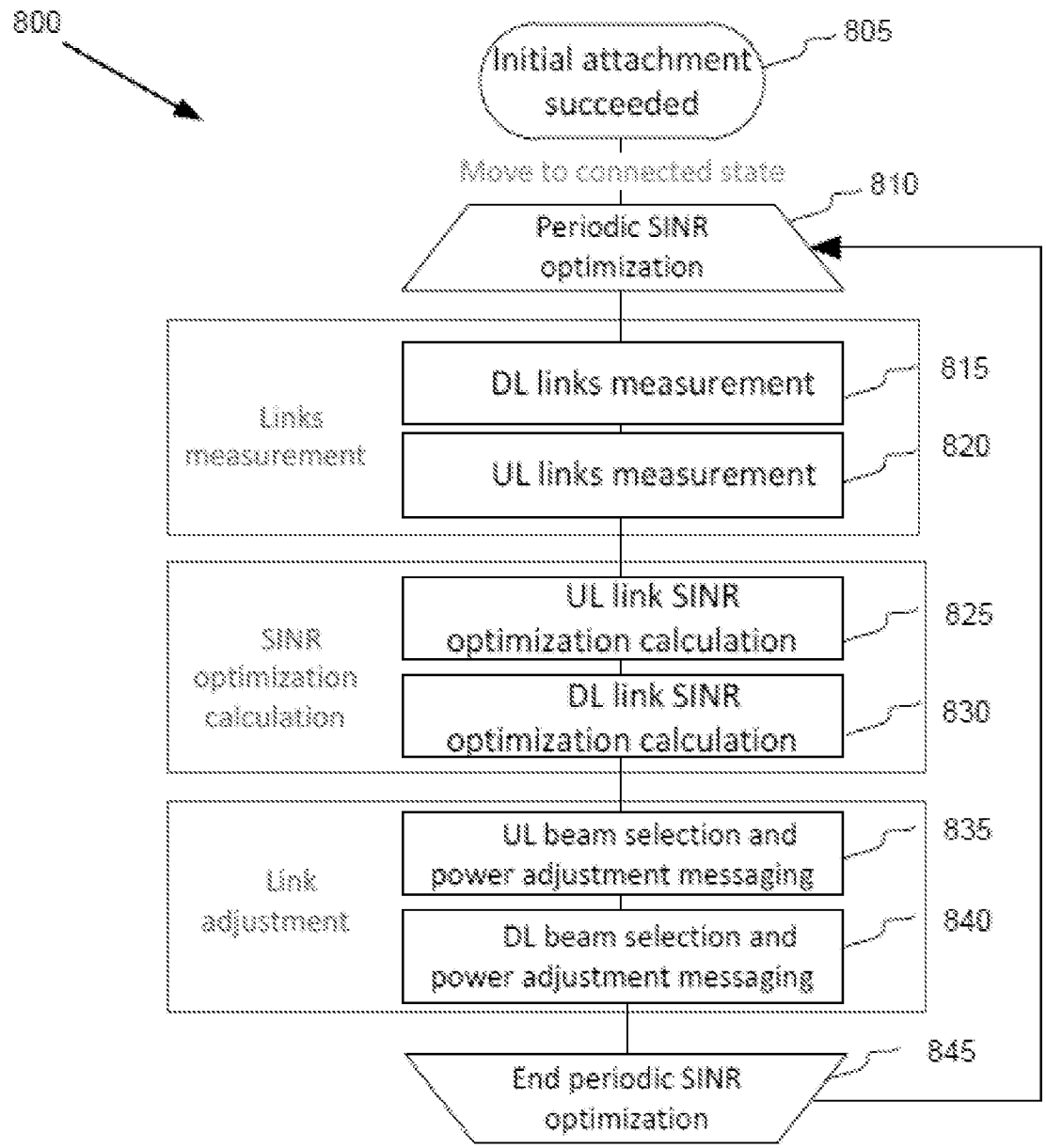
FIG. 8 illustrates a flowchart for re-optimizing the gain of the active links during a connected mode of operation for a lens antenna array system in accordance with an aspect of the disclosure.

Although method 700 establishes active UL and DL links with or without gain optimization so that a connected mode of operation may ensue, note that the channel is open space between the lens antenna array transmitters and receivers. The movement of personnel and other effects can thus readily change the channel properties such that what was an active link becomes degraded. The gain optimization process may thus be repeated as shown for a method 800 in FIG. 8 that occurs during the connected mode of operation. After the initiation discussed with regard to method 700 is completed in a step 805 such that a connected state operation ensues, a periodic (or aperiodic) SINR optimization may be initiated in a step 810. The subsequent SINR optimization is analogous to as discussed for method 700 and includes a link measurement stage having a DL link measurement step 815. In step 815, a signal quality is measured for each active downlink. For example, one measure of signal quality is a signal-to-interference-plus-noise ratio (SINR) but other measures may be measured and optimized in alternate embodiments. The link measurement stage also includes an UL link measurement step 820 in which the signal quality such as the SINR is measured for each active uplink.

An SINR optimization calculation stage follows the link measurement stage analogously as also discussed for FIG. 7. The SINR optimization calculation stage includes an UL link SINR optimization calculation step 825. It is convenient for this calculation to take place in the access point since it is the access point that measured the SINR for the active UL links, but it may be performed by the user terminal in alternative embodiments. Similarly, it is convenient that a DL link optimization calculation step 830 occurs in the user terminal but it may occur in the access point in alternative embodiments. The optimization calculation may be performed using a formula or may be heuristic. For both the UL and the DL, the calculation determines a gain for the power amplifier 320 in the corresponding link.

A link adjustment stage following the SINR optimization calculation stage. The link adjustment stage includes an UL beam selection and power adjustment messaging step 835 in which the access point uses one or more of the active DL links to transmit the calculated UL gain adjustments for the active UL links to the user terminal. Similarly, the user terminal transmits the calculated DL gain adjustments to the access point in a step 840. With both endpoints having the appropriate gains, a connected mode of operation may proceed in a step 845 in which the active DL and UL links transmit data using their power amplifiers 320 at the adjusted gains. Depending upon the periodicity (or aperiodicity), the SINR optimization repeats by a return to step 810.

Figure 9:
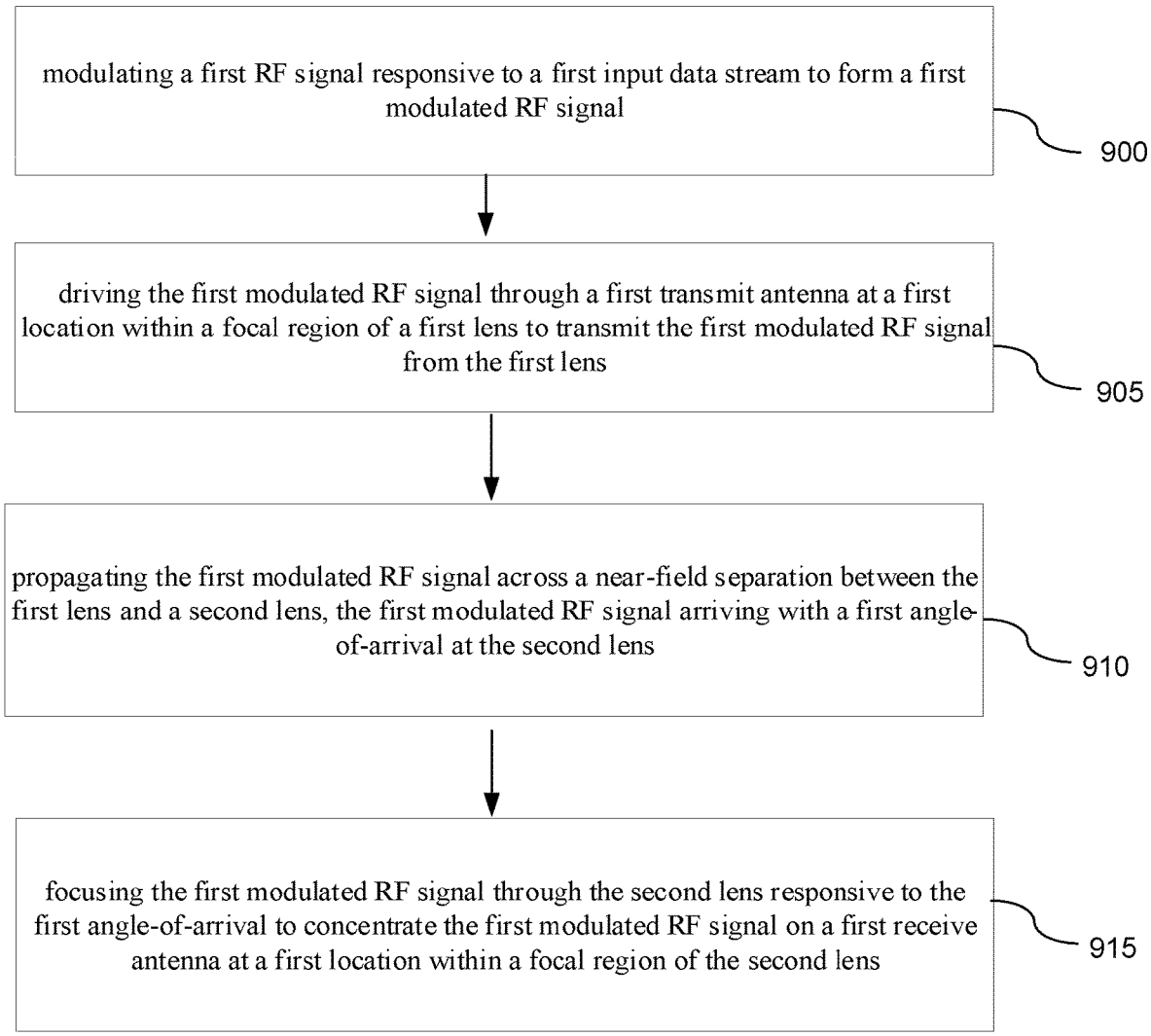
FIG. 9 is a flowchart for an example method of wireless communication in a lens antenna array system in accordance with an aspect of the disclosure.

An example method of wireless communication using a lens antenna system will now be discussed with reference to the flowchart of FIG. 9. The method includes an act 900 of modulating a first RF signal responsive to a first input data stream to form a first modulated RF signal. The modulation in any of modulators 305 is an example of act 900. The method also includes an act 905 of driving the first modulated RF signal through a first transmit antenna at a first location within a focal region of a first lens to transmit the first modulated RF signal from the first lens. The propagation through first lens 120 in any of FIGS. 1A, 1B, and 1C is an example of act 905. The method further includes an act 910 of propagating the first modulated RF signal across a near-field separation between the first lens and a second lens, the first modulated RF signal arriving with a first angle-of-arrival at the second lens. The near-field propagation from first lens 120 to second lens 125 in any of FIGS. 1A, 1B, and 1C is an example of act 910. Finally, the method includes an act 915 of focusing the first modulated RF signal through the second lens responsive to the first angle-of-arrival to concentrate the first modulated RF signal on a first receive antenna at a first location within a focal region of the second lens. The focusing onto any of receive antennas 130, 135, and 140 as discussed with regard to FIGS. 1A, 1B, and 1C is an example of act 915.

Some aspects of the disclosure will now be summarized in the following example clauses:

Clause 1. A lens antenna array system, comprising:
 a first lens;
 a plurality of transmit antennas arranged in a focal region of the first lens;
 a second lens; and
 a plurality of receive antennas arranged in a focal region of the second lens, the first lens being aligned with the second lens so that a plurality of transmitted RF signals propagates from the first lens to the second lens in a near-field regime.

Clause 2. The lens antenna array system of clause 1, further comprising: a plurality of modulators corresponding to the plurality of transmit antennas, each modulator configured to drive a corresponding one of the transmit antennas with a modulated RF signal, the plurality of transmit antennas being arranged in the focal region of the first lens so that a plurality of RF signals from the plurality of transmit antennas are directed though the first lens to form the plurality of transmitted RF signals.

Clause 3. The lens antenna array system of clause 2, wherein each modulator is an on-off keying modulator.

Clause 4. The lens antenna array system of any of clauses 1 and 2, wherein the plurality of transmit antennas and the plurality of receive antennas each comprises a plurality of patch antennas.

Clause 5. The lens antenna array system of clause 3, further comprising:
 a plurality of on-off keying demodulators corresponding to the plurality of receive antennas, each on-off keying demodulator being configured to demodulate a received RF signal from its corresponding receive antenna.

Clause 6. The lens antenna array system of any of clauses 1-5, wherein the second lens is substantially similar to the first lens.

Clause 7. The lens antenna array system of any of clauses 1-6, wherein a central axis of the first lens is substantially aligned with a central axis of the second lens.

Clause 8. The lens antenna array system of clause 3, further comprising:
 a first processor configured to sequentially activate each on-off keying modulator during an acquisition period; and
 a second processor configured to determine a mapping between each transmit antenna and each receive antenna responsive to the sequential activation of each on-off keying modulator.

Clause 9. The lens antenna array system of clause 3, further comprising:

an oscillator configured to drive each on-off keying modulator with an RF signal.

Clause 10. The lens antenna array system of clause 9, wherein the oscillator is a voltage-controlled oscillator.

Clause 11. A method of wireless communication, comprising:

modulating a first RF signal responsive to a first input data stream to form a first modulated RF signal;

driving the first modulated RF signal through a first transmit antenna at a first location within a focal region of a first lens to transmit the first modulated RF signal from the first lens;

propagating the first modulated RF signal across a near-field separation between the first lens and a second lens, the first modulated RF signal arriving with a first angle-of-arrival at the second lens; and focusing the first modulated RF signal through the second lens responsive to the first angle-of-arrival to concentrate the first modulated RF signal on a first receive antenna at a first location within a focal region of the second lens.

Clause 12. The method of clause 11, further comprising:

modulating a second RF signal responsive to a second input data stream to form a second modulated RF signal;

driving the second modulated RF signal through a second transmit antenna at a second location within the focal region of the first lens to transmit the second modulated RF signal from the first lens;

propagating the second modulated RF signal across the near-field separation between the first lens and the second lens, the second modulated RF signal arriving with a second angle-of-arrival at the second lens; and focusing the second modulated RF signal through the second lens responsive to the second angle-of-arrival to concentrate the second modulated RF signal on a second receive antenna at a second location within the focal region of the second lens.

Clause 13. The method of clause 12, further comprising:

dividing a data stream into the first input data stream and the second input data stream.

Clause 14. The method of any of clauses 12-13, wherein the modulating of the first RF signal and of the second RF signal is an on-off keying modulation.

Clause 15. The method of clause 14, further comprising:

receiving a first received RF signal from the first receive antenna;

receiving a second received RF signal from the second receive antenna;

recovering a first data stream and a second data stream responsive to envelope detecting the first received RF signal and the second received RF signal.

Clause 16. A method of wireless communication, comprising:

for a plurality of transmit antennas arranged in a focal region of a first lens so that each transmit antenna maps to a corresponding angle of departure, transmitting an RF signal from each transmit antenna to propagate the RF signal in a near-field regime from the first lens according to the transmit antenna's corresponding angle of departure to arrive at a second lens at a corresponding angle of arrival; and focusing each RF signal through the second lens responsive to the RF signal's corresponding angle of arrival so that each RF signal is focused onto a respective receive antenna from a plurality of receive antennas arranged in a focal region of the second lens.

Clause 17. The method of clause 16, wherein each RF signal has a frequency selected from a sub-THz frequency band.

Clause 18. The method of any of clause 16-17, wherein the transmitting from each transmit antenna comprises:

modulating an oscillator signal responsive to an input data stream to form a modulated RF signal; and amplifying the modulated RF signal to drive the transmit antenna with an amplified RF signal.

Clause 19. The method of clause 18, wherein modulating the oscillator signal comprises an on-off keying modulation of the oscillator signal.

Clause 20. The method of any of clauses 16-18, further comprising:

demodulating a received RF signal from each receive antenna to form a plurality of recovered data streams.

Clause 21. The method of clause 20, further comprising: serializing the recovered data streams to form a high-speed serial data stream.

Clause 22. The method of clause 21, wherein the high-speed serial data stream has a data rate of greater than 50 Gbs.

Clause 23. The method of clause 21, wherein the high-speed serial data stream has a data rate of greater than 100 Gbs.

Clause 24. The method of clause 20, wherein demodulating the received RF signal from each receive antenna comprises envelope detecting the received RF signal.

Clause 25. A lens antenna array system, comprising:

a first processor configured to provide a plurality of baseband input data streams;

a plurality of modulators corresponding to the plurality of baseband input data streams, each modulator in the plurality of modulators configured to modulate a respective baseband input data stream from the plurality of baseband input data streams to produce a modulated RF signal;

a plurality of power amplifiers corresponding to the plurality of modulators, each power amplifier configured to amplify a respective modulator's modulated RF signal according to a gain to produce an amplified modulated RF signal;

a first lens; and a plurality of transmit antennas corresponding to the plurality of power amplifiers, each transmit antenna in the plurality of transmit antennas being configured to transmit the amplified modulated RF signal from a respective power amplifier, the plurality of transmit antennas being arranged in a focal region of the first lens.

Clause 26. The lens antenna array system of clause 25, further comprising:

a second lens; and a plurality of receive antennas arranged in a focal region of the second lens, the first lens being aligned with the second lens so that each amplified modulated RF signal propagates from the first lens to the second lens in a near-field regime.

Clause 27. The lens antenna array system of any of clauses 25-26, wherein each modulator is an on-off keying modulator.

Clause 28. The lens antenna array system of clause 26, wherein the plurality of transmit antennas and the plurality of receive antennas each comprises a plurality of patch antennas.

Clause 29. The lens antenna array system of any of clauses 26 and 28, further comprising:

a plurality of on-off keying demodulators corresponding to the plurality of receive antennas, each on-off keying demodulator being configured to demodulate a received RF signal from its corresponding receive antenna.

Clause 30. The lens antenna array system of any of clauses 26, 28, and 29, wherein the second lens is substantially similar to the first lens.

In various implementations, lens antenna array systems disclosed herein may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple lens antenna array systems. For example, the holder of a license for a portion of licensed spectrum may provide licensed shared access (LSA) to share that spectrum with other parties, e.g., with suitable licensee-determined conditions to gain access.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated herein may be rearranged and/or combined into a single component, step, feature or function or embodied in several components, steps, or functions. Additional elements, components, steps, and/or functions may also be added without departing from novel features disclosed herein. The apparatus, devices, and/or components illustrated herein may be configured to perform one or more of the methods, features, or steps escribed herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A lens antenna array system, comprising:
   a first lens;
   a plurality of transmit antennas arranged in a focal region of the first lens;
   a second lens; and
   a plurality of receive antennas arranged in a focal region of the second lens, the first lens being aligned with the second lens so that a plurality of transmitted RF signals propagates from the first lens to the second lens in a near-field regime.

2. The lens antenna array system of claim 1, further comprising:
   a plurality of modulators corresponding to the plurality of transmit antennas, each modulator configured to drive a corresponding one of the transmit antennas with a modulated RF signal, the plurality of transmit antennas being arranged in the focal region of the first lens so that a plurality of RF signals from the plurality of transmit antennas are directed though the first lens to form the plurality of transmitted RF signals.

3. The lens antenna array system of claim 2, wherein each modulator is an on-off keying modulator.

4. The lens antenna array system of claim 1, wherein the plurality of transmit antennas and the plurality of receive antennas each comprises a plurality of patch antennas.

5. The lens antenna array system of claim 3, further comprising:
a plurality of on-off keying demodulators corresponding to the plurality of receive antennas, each on-off keying demodulator being configured to demodulate a received RF signal from its corresponding receive antenna.

6. The lens antenna array system of claim 3, wherein the second lens is substantially similar to the first lens.

7. The lens antenna array system of claim 1, wherein a central axis of the first lens is substantially aligned with a central axis of the second lens.

8. The lens antenna array system of claim 3, further comprising:
a first processor configured to sequentially activate each on-off keying modulator during an acquisition period; and
a second processor configured to determine a mapping between each transmit antenna and each receive antenna responsive to a sequential activation of each on-off keying modulator.

9. The lens antenna array system of claim 3, further comprising:
an oscillator configured to drive each on-off keying modulator with an RF signal.

10. The lens antenna array system of claim 9, wherein the oscillator is a voltage-controlled oscillator.

11. A method of wireless communication, comprising:
modulating a first RF signal responsive to a first input data stream to form a first modulated RF signal;
driving the first modulated RF signal through a first transmit antenna at a first location within a focal region of a first lens to transmit the first modulated RF signal from the first lens;
propagating the first modulated RF signal across a near-field separation between the first lens and a second lens, the first modulated RF signal arriving with a first angle-of-arrival at the second lens; and
focusing the first modulated RF signal through the second lens responsive to the first angle-of-arrival to concentrate the first modulated RF signal on a first receive antenna at a first location within a focal region of the second lens.

12. The method of claim 11, further comprising:
modulating a second RF signal responsive to a second input data stream to form a second modulated RF signal;
driving the second modulated RF signal through a second transmit antenna at a second location within the focal region of the first lens to transmit the second modulated RF signal from the first lens;
propagating the second modulated RF signal across the near-field separation between the first lens and the second lens, the second modulated RF signal arriving with a second angle-of-arrival at the second lens; and
focusing the second modulated RF signal through the second lens responsive to the second angle-of-arrival to concentrate the second modulated RF signal on a second receive antenna at a second location within the focal region of the second lens.

13. The method of claim 12, further comprising:
dividing a data stream into the first input data stream and the second input data stream.

14. The method of claim 12, wherein the modulating of the first RF signal and of the second RF signal is an on-off keying modulation.

15. The method of claim 14, further comprising:
receiving a first received RF signal from the first receive antenna;
receiving a second received RF signal from the second receive antenna;
recovering a first data stream and a second data stream responsive to envelope detecting the first received RF signal and the second received RF signal.

16. A method of wireless communication, comprising:
for a plurality of transmit antennas arranged in a focal region of a first lens so that each transmit antenna maps to a corresponding angle of departure;
transmitting an RF signal from each transmit antenna to propagate the RF signal in a near-field regime from the first lens according to the transmit antenna's corresponding angle of departure to arrive at a second lens at a corresponding angle of arrival; and
focusing each RF signal through the second lens responsive to the RF signal's corresponding angle of arrival so that each RF signal is focused onto a respective receive antenna from a plurality of receive antennas arranged in a focal region of the second lens.

17. The method of claim 16, wherein each RF signal has a frequency selected from a sub-THz frequency band.

18. The method of claim 16, wherein the transmitting of the RF signal from each transmit antenna comprises:
modulating an oscillator signal responsive to an input data stream to form a modulated RF signal; and
amplifying the modulated RF signal to drive the transmit antenna with the RF signal.

19. The method of claim 18, wherein modulating the oscillator signal comprises an on-off keying modulation of the oscillator signal.

20. The method of claim 18, further comprising:
demodulating a received RF signal from each receive antenna to form a plurality of recovered data streams.

21. The method of claim 20, further comprising: serializing the recovered data streams to form a high-speed serial data stream.

22. The method of claim 20, wherein demodulating the received RF signal from each receive antenna comprises envelope detecting the received RF signal.

23. The method of claim 21, wherein the high-speed serial data stream has a data rate of greater than 50 Gbs.

24. The method of claim 21, wherein the high-speed serial data stream has a data rate of greater than 100 Gbs.

25. A lens antenna array system, comprising:
a first processor configured to provide a plurality of baseband input data streams;
a plurality of modulators corresponding to the plurality of baseband input data streams, each modulator in the plurality of modulators configured to modulate a respective baseband input data stream from the plurality of baseband input data streams to produce a modulated RF signal;
a plurality of power amplifiers corresponding to the plurality of modulators, each power amplifier configured to amplify a respective modulator's modulated RF signal according to a gain to produce an amplified modulated RF signal;
a first lens;
a plurality of transmit antennas corresponding to the plurality of power amplifiers, each transmit antenna in the plurality of transmit antennas being configured to transmit the amplified modulated RF signal from a respective power amplifier, the plurality of transmit antennas being arranged in a focal region of the first lens a second lens; and a plurality of receive antennas arranged in a focal region of the second lens, the first lens being aligned with the second lens so that each amplified modulated RF signal propagates from the first lens to the second lens in a near-field regime.

26. The lens antenna array system of claim 25, wherein each modulator is an on-off keying modulator.

27. The lens antenna array system of claim 26, further comprising:

a plurality of on-off keying demodulators corresponding to the plurality of receive antennas, each on-off keying demodulator being configured to demodulate a received RF signal from its corresponding receive antenna.

28. The lens antenna array system of claim 25, wherein the plurality of transmit antennas and the plurality of receive antennas each comprises a plurality of patch antennas.

29. The lens antenna array system of claim 25, wherein the second lens is substantially similar to the first lens.

* * * * *